US012333488B2

(12) United States Patent
Wang et al.

(10) Patent No.: US 12,333,488 B2
(45) Date of Patent: Jun. 17, 2025

(54) SYSTEMS AND METHODS OF DETECTING PRICE TAGS AND ASSOCIATING THE PRICE TAGS WITH PRODUCTS

(71) Applicant: Walmart Apollo, LLC, Bentonville, AR (US)

(72) Inventors: Jing Wang, Dallas, TX (US); Han Zhang, Allen, TX (US); Lingfeng Zhang, Dallas, TX (US); Zhaoliang Duan, Frisco, TX (US); Mingquan Yuan, Flower Mound, TX (US); Wei Wang, Dallas, TX (US); Benjamin R. Ellison, San Francisco, CA (US); Avinash M. Jade, Bangalore (IN); Raghava Balusu, Achanta (IN); Zhichun Xiao, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 314 days.

(21) Appl. No.: 17/971,350

(22) Filed: Oct. 21, 2022

(65) Prior Publication Data

US 2024/0135315 A1 Apr. 25, 2024
US 2024/0232795 A9 Jul. 11, 2024

(51) Int. Cl.
*G06Q 10/087* (2023.01)
*G06T 7/50* (2017.01)
(Continued)

(52) U.S. Cl.
CPC ............ *G06Q 10/087* (2013.01); *G06T 7/50* (2017.01); *G06T 7/62* (2017.01); *G06V 10/25* (2022.01); *G06V 10/762* (2022.01); *G06V 30/41* (2022.01)

(58) Field of Classification Search
CPC ........... G06Q 10/087; G06T 7/50; G06T 7/62; G06V 10/25; G06V 10/762; G06V 30/41; G06V 20/52
(Continued)

(56) References Cited

U.S. PATENT DOCUMENTS 5,074,594 A 12/1991 Laganowski
6,570,492 B1 5/2003 Peratoner
(Continued)

FOREIGN PATENT DOCUMENTS

CN 106347550 B 8/2019
CN 110348439 B 10/2019
(Continued)

OTHER PUBLICATIONS

Paolanti, Marina et al. Deep understanding of shopper behaviours and interactions using RGB-D vision. Machine Vision and Applications; New York vol. 31, Iss. 7-8, (Nov. 2020). (Year: 2020).*
(Continued)

*Primary Examiner* — Florian M Zeender
*Assistant Examiner* — Fawaad Haider
(74) *Attorney, Agent, or Firm* — Foley IP Law, PLLC

(57) ABSTRACT

Systems and methods of analyzing on-shelf price tag labels and products at a product storage facility include an image capture device that captures one or more images of one or more product storage structures at a product storage facility. A computing device communicatively coupled to the image capture device analyzes the images of the product storage structures captured by the image capture device and detects individual price tag labels and individual products located on the product storage structure. Based on the detection of the price tag labels and the products, the computing device also defines separate product storage spaces of the product storage structure, determines which price tag labels are
(Continued)

allocated to which of the separate product storage spaces, and associates in a database the price tag labels allocated to the product storage spaces with the products stored in those product storage spaces.

18 Claims, 7 Drawing Sheets

(51) Int. Cl.
    *G06T 7/62*           (2017.01)
    *G06V 10/25*         (2022.01)
    *G06V 10/762*       (2022.01)
    *G06V 30/41*        (2022.01)

(58) Field of Classification Search
    USPC .......................................................... 705/28
    See application file for complete search history.

(56) References Cited

U.S. PATENT DOCUMENTS

| | | |
|---|---|---|
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 | 2/2019 | Pisoni |
| 10,373,116 B2 | 8/2019 | Medina |
| 10,572,757 B2 | 2/2020 | Graham |
| 10,592,854 B2 | 3/2020 | Schwartz |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2011/0040427 A1 | 2/2011 | Ben-Tzvi |
| 2014/0002239 A1 | 1/2014 | Rayner |
| 2014/0247116 A1 | 9/2014 | Davidson |
| 2014/0307938 A1 | 10/2014 | Doi |
| 2015/0363660 A1 | 12/2015 | Vidal |
| 2016/0203525 A1 | 7/2016 | Hara |
| 2017/0106738 A1 | 4/2017 | Gillett |
| 2017/0286773 A1 | 10/2017 | Skaff |
| 2018/0005176 A1 | 1/2018 | Williams |
| 2018/0018788 A1 | 1/2018 | Olmstead |
| 2018/0197223 A1 | 7/2018 | Grossman |
| 2018/0260772 A1 | 9/2018 | Chaubard |
| 2019/0025849 A1 | 1/2019 | Dean |
| 2019/0034864 A1* | 1/2019 | Skaff .................. G06Q 10/087 |
| 2019/0043003 A1 | 2/2019 | Fisher |
| 2019/0050932 A1 | 2/2019 | Dey |
| 2019/0087772 A1 | 3/2019 | Medina |
| 2019/0163698 A1 | 5/2019 | Kwon |
| 2019/0197561 A1 | 6/2019 | Adato |
| 2019/0215424 A1* | 7/2019 | Adato .................... G06T 7/521 |
| 2019/0220482 A1 | 7/2019 | Crosby |
| 2019/0236531 A1 | 8/2019 | Adato |
| 2020/0246977 A1 | 8/2020 | Swietojanski |
| 2020/0265494 A1 | 8/2020 | Glaser |
| 2020/0324976 A1 | 10/2020 | Diehr |
| 2020/0356813 A1 | 11/2020 | Sharma |
| 2020/0380226 A1 | 12/2020 | Rodriguez |
| 2020/0387858 A1 | 12/2020 | Hasan |
| 2021/0049541 A1 | 2/2021 | Gong |
| 2021/0049542 A1 | 2/2021 | Dalal |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0248547 A1* | 8/2021 | Bizoara ................ G06Q 30/018 |
| 2021/0272269 A1 | 9/2021 | Suzuki |
| 2021/0319684 A1 | 10/2021 | Ma |
| 2021/0342914 A1 | 11/2021 | Dalal |
| 2021/0400195 A1 | 12/2021 | Adato |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0114403 A1 | 4/2022 | Shaw |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0262008 A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,751, filed Oct. 11, 2022, Yilun Chen.
U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/983,773, filed Nov. 9, 2022, Lingeng Zhang.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 126-131.
Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-13.
Paolanti, Marine et al.; "Mobile robot for retail surveying and inventory using visual and textual analysis of monocular pictures based on deep learning"; European Conference on Mobile Robots; Sep. 2017, 6 pages.
Ramanpreet Kaur et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.

(56) References Cited

OTHER PUBLICATIONS

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-12.

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.iee.org/document/9156454>; pp. 10778-10787.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-8.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal et al.; "Object identification for inventory management using convolutional neural network"; IEEE Applied Imagery Pattern Recognition Workshop (AIPR); Oct. 2016, 6 pages.

\* cited by examiner

SYSTEMS AND METHODS OF DETECTING PRICE TAGS AND ASSOCIATING THE PRICE TAGS WITH PRODUCTS

TECHNICAL FIELD

This disclosure relates generally to managing inventory at product storage facilities, and in particular, to associating price tag labels with on-shelf products at a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a price tag label assigned thereto. It is common for workers of such product storage facilities to manually (e.g., visually) inspect product display shelves and other product storage spaces to determine which labels are associated with which products, and to determine whether the labels and the products are properly associated.

Given the very large number of product storage areas such as shelves, pallets, and other product displays at product storage facilities of large retailers, and the even larger number of products stored in the product storage areas, manual inspection of the price tag labels and the products on the shelves/pallets by the workers is very time consuming and significantly increases the operations cost for a retailer, since these workers could be performing other tasks if they were not involved in manually inspecting the product storage areas, price tag labels, and products.

BRIEF DESCRIPTION OF THE DRAWINGS

Disclosed herein are embodiments of analyzing on-shelf price tag labels and products at a product storage facility. This description includes drawings, wherein.

Figure 1:
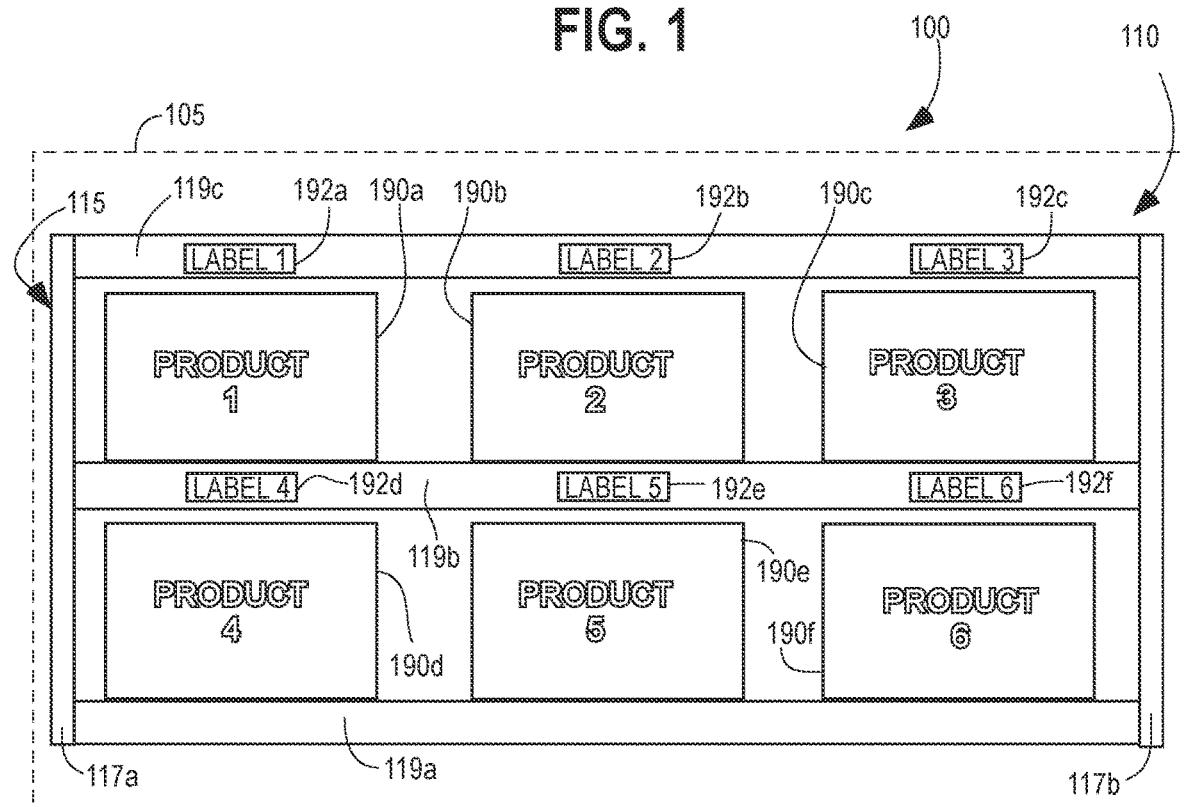
FIG. 1 is a diagram of an exemplary system of analyzing price tag labels and on-shelf products at a product storage facility in accordance with some embodiments, depicting a front view of a product storage structure including several product storage areas storing various products having price tag labels associated therewith that is being monitored by an image capture device that is configured to move about the product storage facility.
Figure 1:
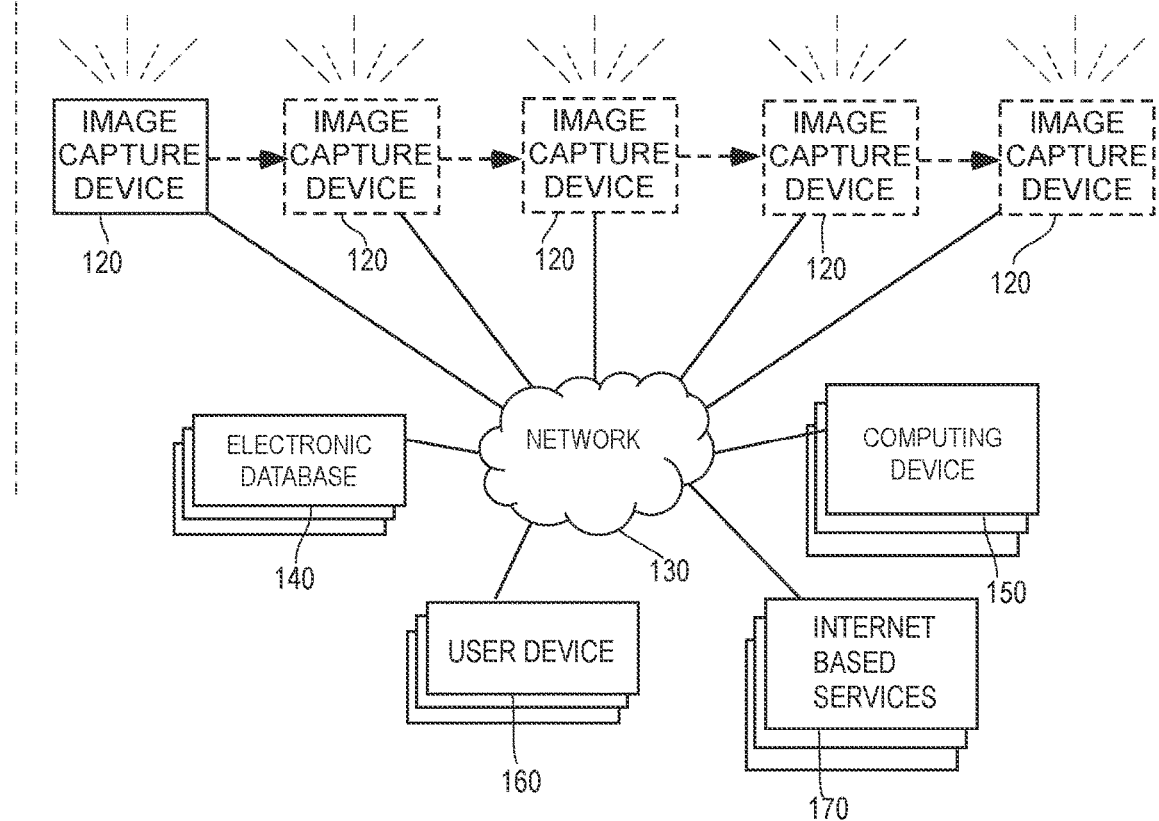

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods of analyzing price tag labels and on-shelf products at a product storage facility include an image capture device that captures one or more images of one or more product storage structures at a product storage facility. A computing device communicatively coupled to the image capture device analyzes the images of the product storage structures captured by the image capture device and detects individual price tag labels and individual products located on the product storage structure. Based on the detection of the price tag labels and the products, the computing device also defines separate product storage spaces of the product storage structure, determines which price tag labels are allocated to which of the separate product storage spaces, and associates in a database the price tag labels allocated to the product storage spaces with the products stored in those product storage spaces.

In some embodiments, a system for analyzing on-shelf price tag labels and products at a product storage facility includes an image capture device having a field of view that includes a product storage structure at the product storage facility having the products arranged thereon and being configured to capture one or more images of the product storage structure. The system further includes a computing device including a control circuit, the computing device being communicatively coupled to the image capture device. The control circuit is configured to: analyze the at least one image of the product storage structure captured by the image capture device to detect individual ones of price tag labels located on the product storage structure and analyze the at least one image of the product storage structure to detect individual ones of the products located on the product storage structure. Based on detection of the individual ones of the products located on the product storage structure, the control circuit is configured to define separate product storage spaces of the product storage structure, wherein each of the separate product storage spaces contains a group of identical products therein. Based on detection of the individual ones of the price tag labels located on the product storage structure and based on a definition of the separate product storage spaces of the product storage structure, the control circuit is configured to determine a first price tag label that is allocated to a first product storage space of the separate product storage spaces of the product storage structure. Based on a determination of the first price tag label that is allocated to the first product storage space, the control circuit is configured to associate the first price tag label with each of the products in the group of identical products stored in the first product storage space.

In some embodiments, a method of analyzing on-shelf price tag labels and products at a product storage facility includes capturing, via an image capture device, one or more images of a product storage structure at the product storage facility having the products arranged thereon, and obtaining, by a computing device communicatively coupled to the image capture device and including a control circuit, at least one image of the product storage structure captured by the image capture device. The method further includes, by the control circuit of the computing device: analyzing the at least one image of the product storage structure captured by the image capture device to detect individual ones of the price tag labels located on the product storage structure; analyzing the at least one image of the product storage structure to detect individual ones of the products located on the product storage structure; based on detection of the individual ones of the products located on the product storage structure, defining separate product storage spaces of the product storage structure, wherein each of the separate product storage spaces contains a group of identical products therein; based on detection of the individual ones of the price tag labels located on the product storage structure and based on a definition of the separate product storage spaces of the product storage structure, determining a first price tag label that is allocated to a first product storage space of the separate product storage spaces of the product storage structure; and based on a determination of the first price tag label that is allocated to the first product storage space, associating the first price tag label with each of the products in the group of identical products stored in the first product storage space.

FIG. 1 shows an embodiment of a system 100 of analyzing on-shelf price tag labels 192 and on-shelf products 190 at a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that the system 100 may include multiple movable image capture devices 120 located throughout the product storage facility 105 that monitor hundreds of product storage areas 110 of and thousands of product storage structures 115. It is understood the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Notably, while the price tag labels 192a-192f are referred to herein as "on-shelf price tag labels," it will be appreciated that the price tag labels 192a-192f do not necessarily have to be affixed to the horizontal support members 119a-119c (e.g., shelves) of the product support structure 115 as shown in FIG. 1 and may be located in a different location (e.g., on the vertical support members 117a-117b).

Notably, the term "product storage structure" as used herein generally refers to a structure on which products 190a-190f are stored, and may include a pallet, a shelf cabinet, a single shelf, table, rack, refrigerator, freezer, displays, bins, gondola, case, countertop, or another product display. Likewise, it will be appreciated that the number of individual products 190a-190f representing six exemplary distinct products (generically labeled as "Product 1," "Product 2," "Product 3," "Product 4," Product 5," and "Product 6") is chosen for simplicity and by way of example only, and that the product storage structure 115 may store more than one unit of each of the products 190a-190f. Further, the size and shape of the products 190a-190f in FIG. 1 have been shown by way of example only, and it will be appreciated that the individual products 190a-190f may have various sizes and shapes. Notably, the term "products" may refer to individual products 190a-190f (some of which may be single-piece/single-component products and some of which may be multi-piece/multi-component products), as well as to packages or containers of products 190a-190f, which may be plastic- or paper-based packaging that includes multiple units of a given product 190a-190f (e.g., a plastic wrap that includes 36 rolls of identical paper towels, a paper box that includes 10 packs of identical diapers, etc.). Alternatively, the packaging of the individual products 190a-190f may be a plastic- or paper-based container that encloses one individual product 190a-190f (e.g., a box of cereal, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 is configured as a robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet based/cloud-based service module) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182, 184) of the product storage area 110 captured by the image capture device 120 while the image capture device 120 is moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
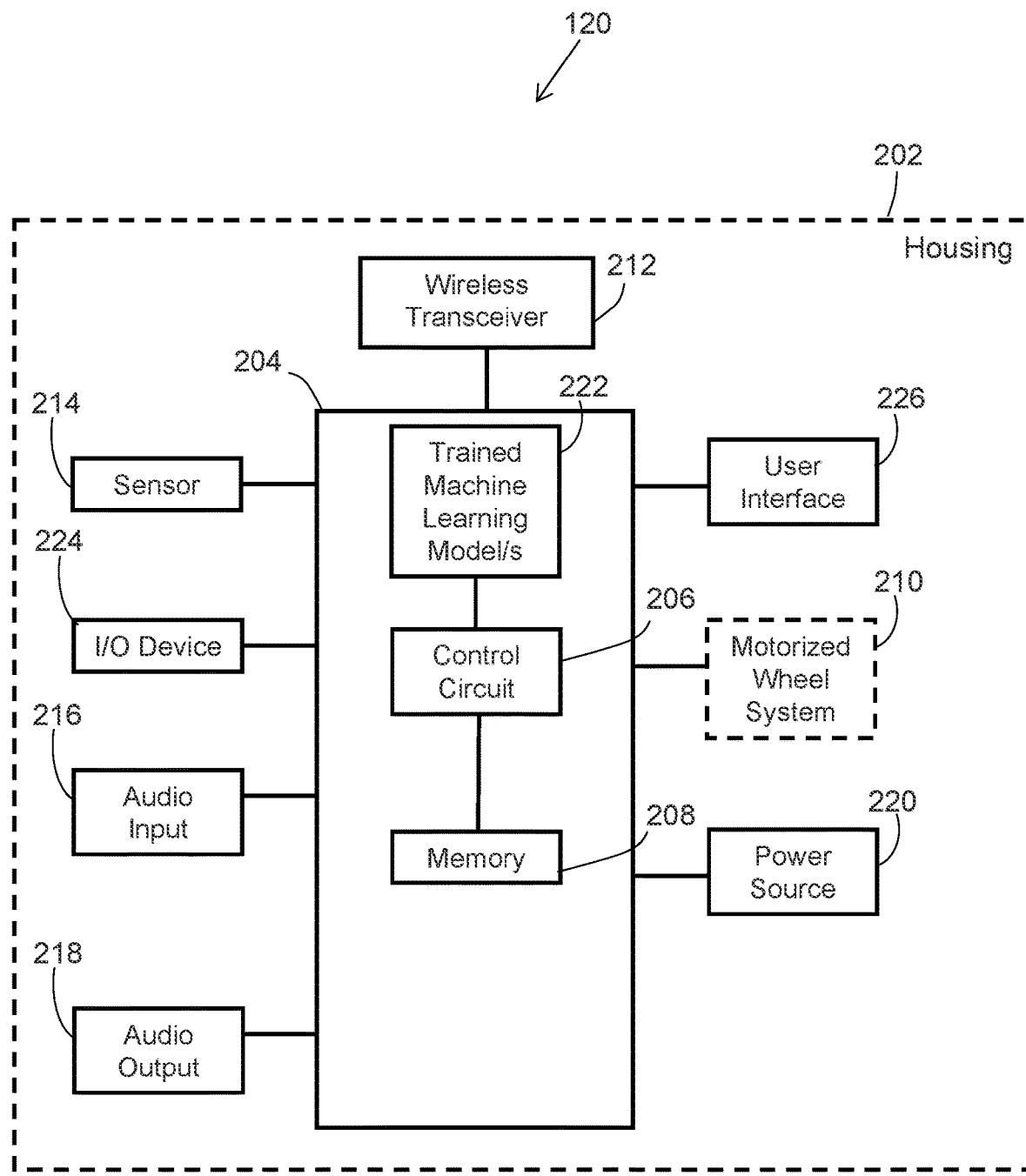
FIG. 2 is a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process one or more images 180 of product storage areas 110 at the product storage facility 105 to detect and/or recognize one or more products 190a-190f using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic device capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
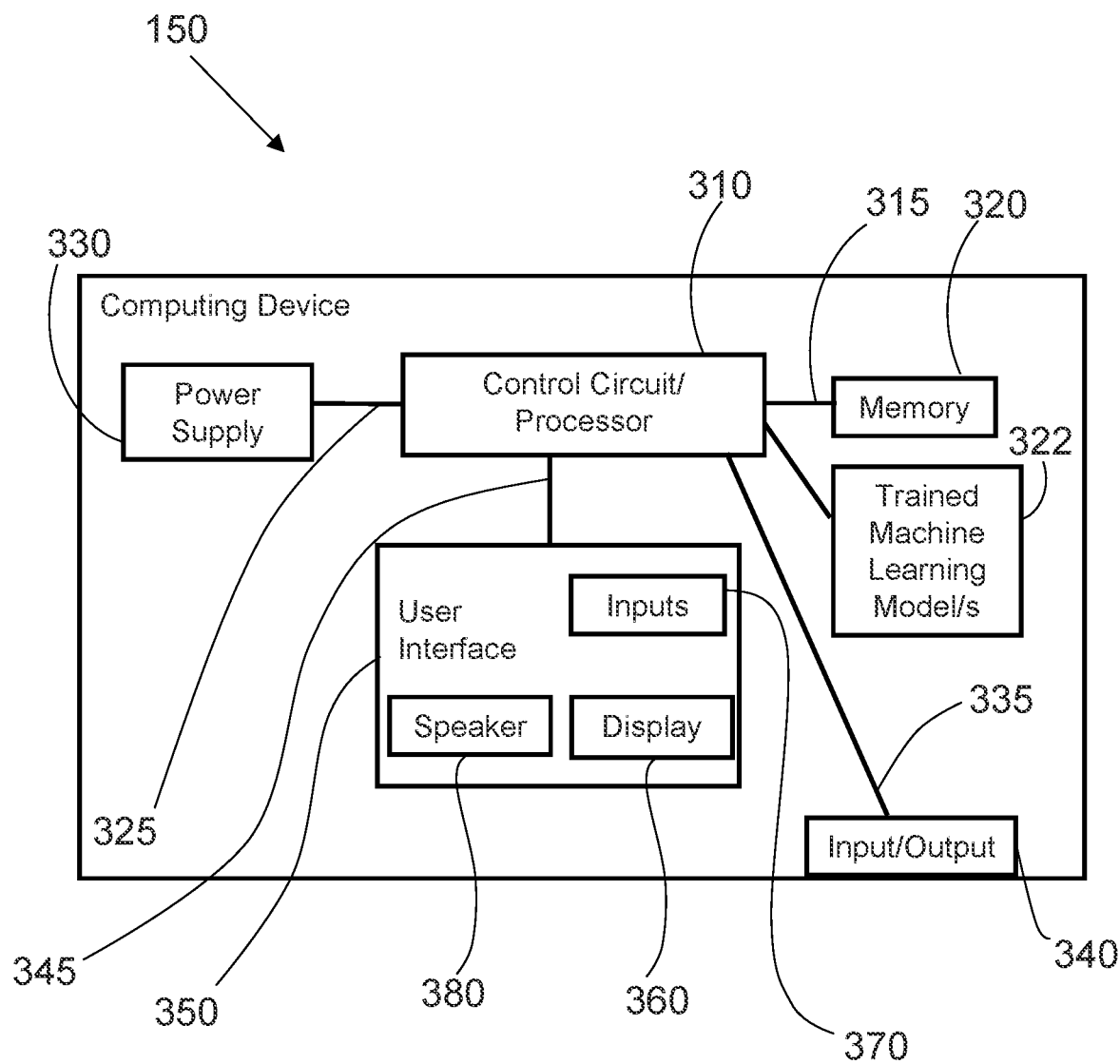
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 4:
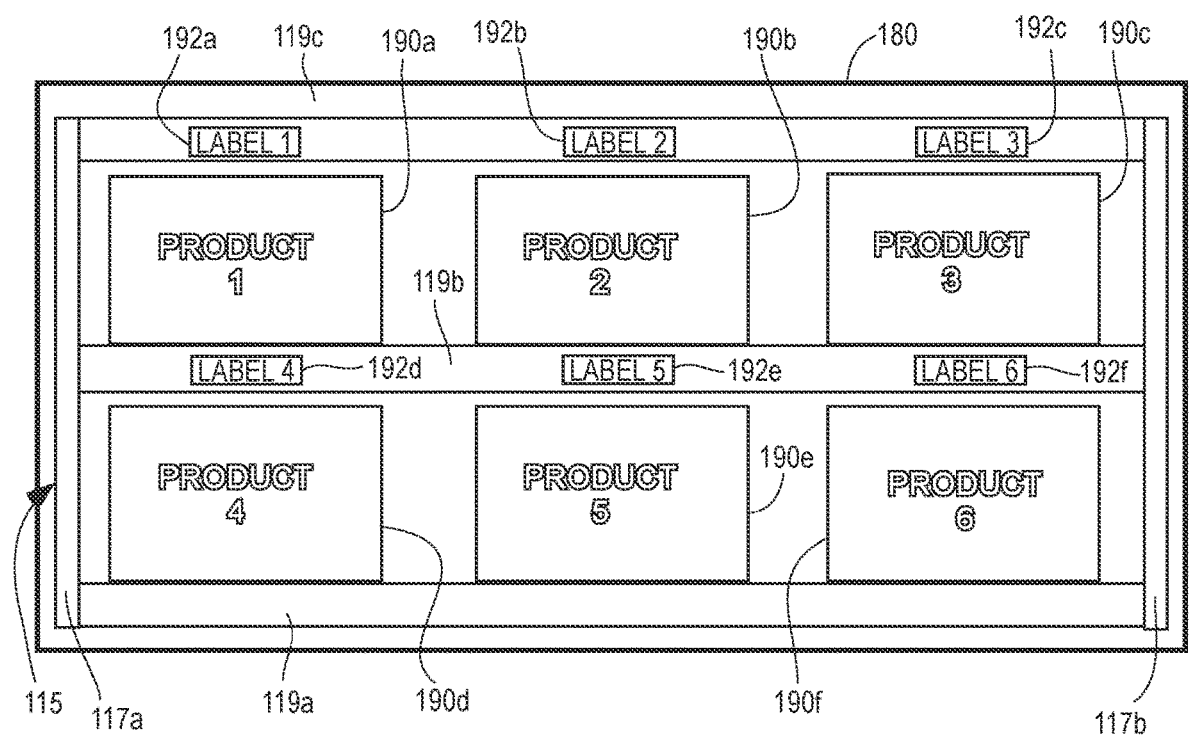
FIG. 4 is a diagram of an exemplary image of the product storage structure of FIG. 1 taken by the image capture device, fully showing the product storage structure of FIG. 1 and all of the products and price tag labels thereon.
Figure 5:
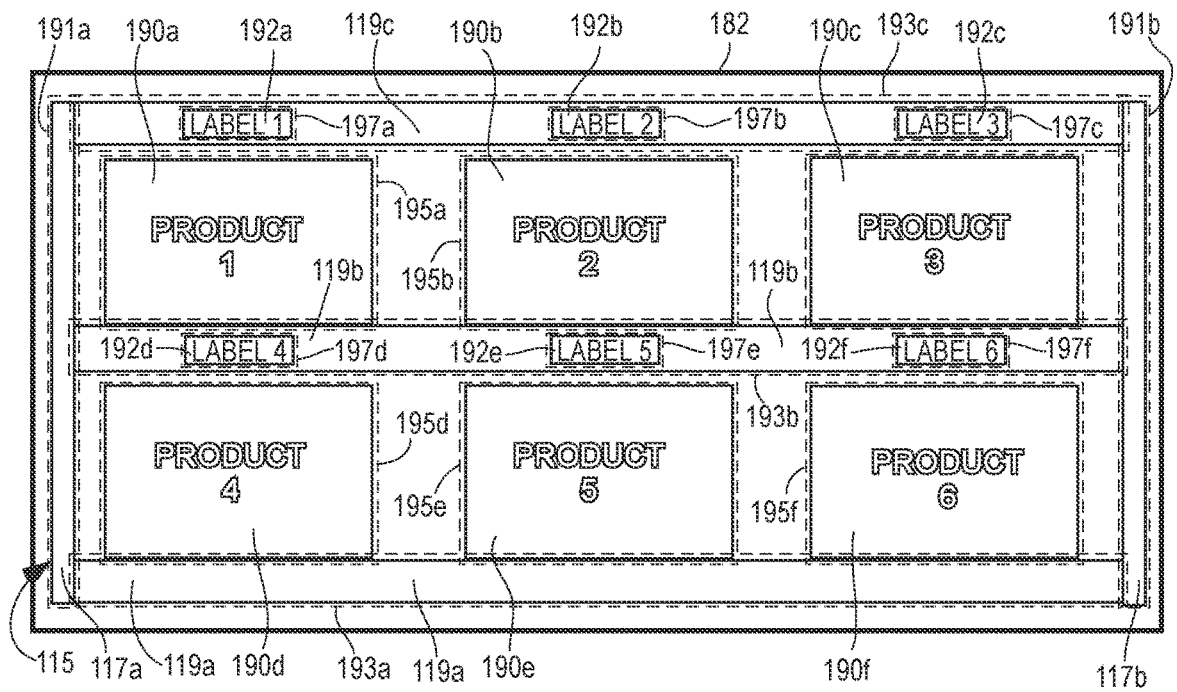
FIG. 5 is a diagram of the exemplary image of FIG. 4, after the image is processed to detect the individual products and the individual price tag labels located on the product storage structure and to generate virtual boundary lines around each of the products and each of the price tag labels detected in the image.
Figure 6:
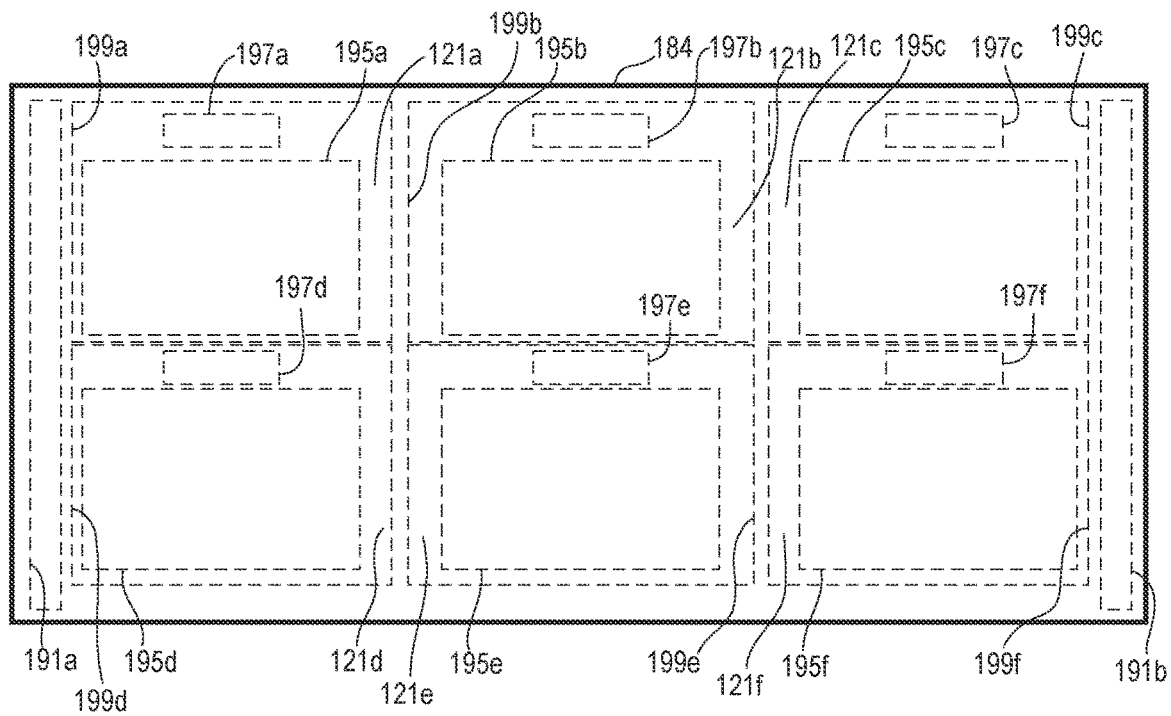
FIG. 6 is a diagram of the exemplary image of FIG. 5, after the image is processed to cluster the virtual boundary lines to determine a number of adjacent product storage areas (each storing separate products) detected in the image, which permits the association of each price tag label with a respective one of the product storage areas.

The control circuit 310 of the computing device 150 is also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the individual products 190a-190f stocked thereon). The input/output 340 of the computing device 150 can also send signals to other devices, for example, a signal to the electronic database 140 including a raw image 180 of a product storage structure 115 (as shown in FIG. 4), or a processed image 182 of the product storage structure 115 (as shown in FIG. 5), or a processed image 184 of the product storage structure 115 (as shown in FIG. 6). Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or relabel a given product storage structure 115 based on analysis by the computing device 150 of the image 180 of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120, or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. In certain aspects, the image capture device 120 is configured to move about the product storage area 110 while capturing one or more images 180 of the product storage structure 115 at certain predetermined time intervals (e.g., every 1 second, 5 seconds, 10 seconds, etc.). The images 180 captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more raw or processed images 180 of the product storage area 110 captured by the image capture device 120 while moving about the product storage area 110. In particular, in some aspects, the control circuit 310 of the computing device 150 is programmed to process a raw image 180 (captured by the image capture device 120 and obtained by the computing device 150 from the electronic database 140 or from the image capture device 120) to extract the raw image data and meta data from the image. In some aspects, the image 180 captured by the image capture device 120 may be processed via web-/cloud-based image processing service 170, which may be installed on the computing device 150 (or communicatively coupled to the computing device 150) and executed by the control circuit 310.

In some embodiments, the meta data extracted from the image 180 captured by the image capture device 120, when processed by the control circuit 310 of the computing device 150, enables the control circuit 310 of the computing device 150 to detect the physical location of the portion of the product storage area 110 and/or product storage structure 115 depicted in the image 180 and/or the physical locations and characteristics (e.g., size, shape, etc.) of the individual products 190a-190f and price tag labels 192a-192f depicted in the image 180.

With reference to FIGS. 4 and 5, in some aspects, the control circuit 310 of the computing device 150 is configured to process the data extracted from the image 180 captured by the image capture device 120 to detect the overall size and shape of each of the individual products 190a-190f located on the product storage structure 115 captured in the image 180. In some embodiments, the control circuit 310 is configured to process the data extracted from the image 180 and detect each of the individual products 190a-190f and each of the price tag labels 192a-192f in the image 180 by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the images 180 captured by the image capture device 120; meta data extracted from the images 180 captured by the image capture device 120; reference image data associated with reference images of various product storage structures 115 at the product storage facility 105; reference images of various products 190a-190f stocked and/or sold at the product storage facility 105; reference images of various price tag labels 192a-192f applied to the product structures 115 at the product storage facility 105; and planogram data associated with the product storage facility 105.

In some embodiments, the control circuit 310 may be trained to process one or more images 180 of product storage areas 110 at the product storage facility 105 to detect and/or recognize one or more products 190a-190f using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein. It will be appreciated that, in some embodiments, the control circuit 310 does not process the raw image 180 shown in FIG. 4 to result in the processed image 182 shown in FIG. 5, and that such processing is performed by an internet-based service 170, after which the processed image 182 is obtained by the control circuit 310 for further analysis.

In some aspects, the control circuit 310 is configured to process the data extracted from the image 180 via computer vision and one or more trained neural networks to detect each of the individual products 190a-190f located on the product storage structure 115 in the image 180, and to generate virtual boundary lines 195a-195f (as seen in image 182 in FIG. 5) around each one of the individual products 190a-190f detected in the image 180. By the same token, in some aspects, the control circuit 310 is configured to process the data extracted from the image 180 via computer vision and one or more trained neural networks to detect each of the individual price tag labels 192a-192f located on the product storage structure 115 in the image 180, and to generate virtual boundary lines 197a-197f (as seen in image 182 in FIG. 5) around each one of the individual price tag labels 192a-192f detected in the image 180. In addition, in some aspects, the control circuit 310 is configured to process the data extracted from the image 180 via computer vision and one or more trained neural networks to detect each of the individual vertical support members 117a-117b (e.g., vertical steel bars, rods, etc.) interconnecting the horizontal support members 119a-119c (e.g., shelves, etc.) of the exemplary product storage structure 115 in the image 180, and to generate virtual boundary lines 191a-191b (as seen in image 182 in FIG. 5) around each one of the individual vertical support members 119a-119b detected in the image 180.

As seen in the image 182 in FIG. 5, the virtual boundary lines 195a-195f extend about the outer edges of each of the individual products 190a-190f located on the product storage structure 115, and form a perimeter around each of the individual products 190a-190f. Similarly, the virtual boundary lines 197a-197f extend about the outer edges of each of the individual price tag labels 192a-192f located on the product storage structure 115, and form a perimeter around each of the individual price tag labels 192a-192f. Likewise, the virtual boundary lines 191a-191b extend about the outer edges of each of the vertical support members 119a-119b of the product storage structure 115, and form a perimeter around each of the vertical support members 119a-119b. Generally, the control circuit 310 is programmed to interpret each of the virtual boundary lines 195a-195f as surrounding only one individual product 190a-190f, to interpret each of the virtual boundary lines 197a-197f as surrounding only one individual price tag label 192a-192f, and to interpret each of the virtual boundary lines 191a-191b as surrounding only one individual vertical support member 119a-119b.

In some embodiments, after generating the virtual boundary lines 195a-195f around the products 190a-190f and the virtual boundary lines 197a-197f around the price tag labels 192a-192f and the virtual boundary lines 191a-191b around the vertical support members 119a-119b, the control circuit 310 of the computing device 150 is programmed to cause the computing device 150 to transmit a signal including the processed image 182 over the network 130 to the electronic database 140 for storage. In one aspect, this image 182 may be used by the control circuit 310 in subsequent image detection operations and/or training or retraining a neural network model as a reference model of a visual representation of the product storage structure 115 and/or products 190a-190f and/or price tag labels 192a-192f and/or vertical support members 119a-119b. More specifically, in some implementations, the control circuit 310 is programmed to perform product detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115 and/or products 190a-190f and/or price tag labels 192a-192f by a worker of the product storage facility, and in response to an input received from an electronic user device 160 of the worker.

In some embodiments, after the control circuit 310 processes the image 180 by the control circuit 310 of the computing device 150 to detect the individual products 190a-190f within the image 180 and to generate virtual boundary lines 195a-195f around each of the individual products 190a-190f, the control circuit 310 is programmed to define separate product storage spaces 121a-121f of the product storage structure 115 that contain a group of identical products 190a-190f therein. In certain implementations, after the control circuit 310 of the computing device 150 detects the individual ones of the price tag labels 192a-192f located on the product storage structure 115 and defines the separate product storage spaces 121a-121f of the product storage structure 115, the control circuit 310 of the computing device is programmed to determine which price tag labels 192a-192f are allocated to which of the product storage spaces 121a-121f of the product storage structure 115, and associate (e.g., by sending a signal to update the electronic database 140) each of the price tag labels 192a-192f with their respective product storage spaces 121a-121f and with the products 190a-190f stored in those product storage spaces 121a-121f.

Figure 7:
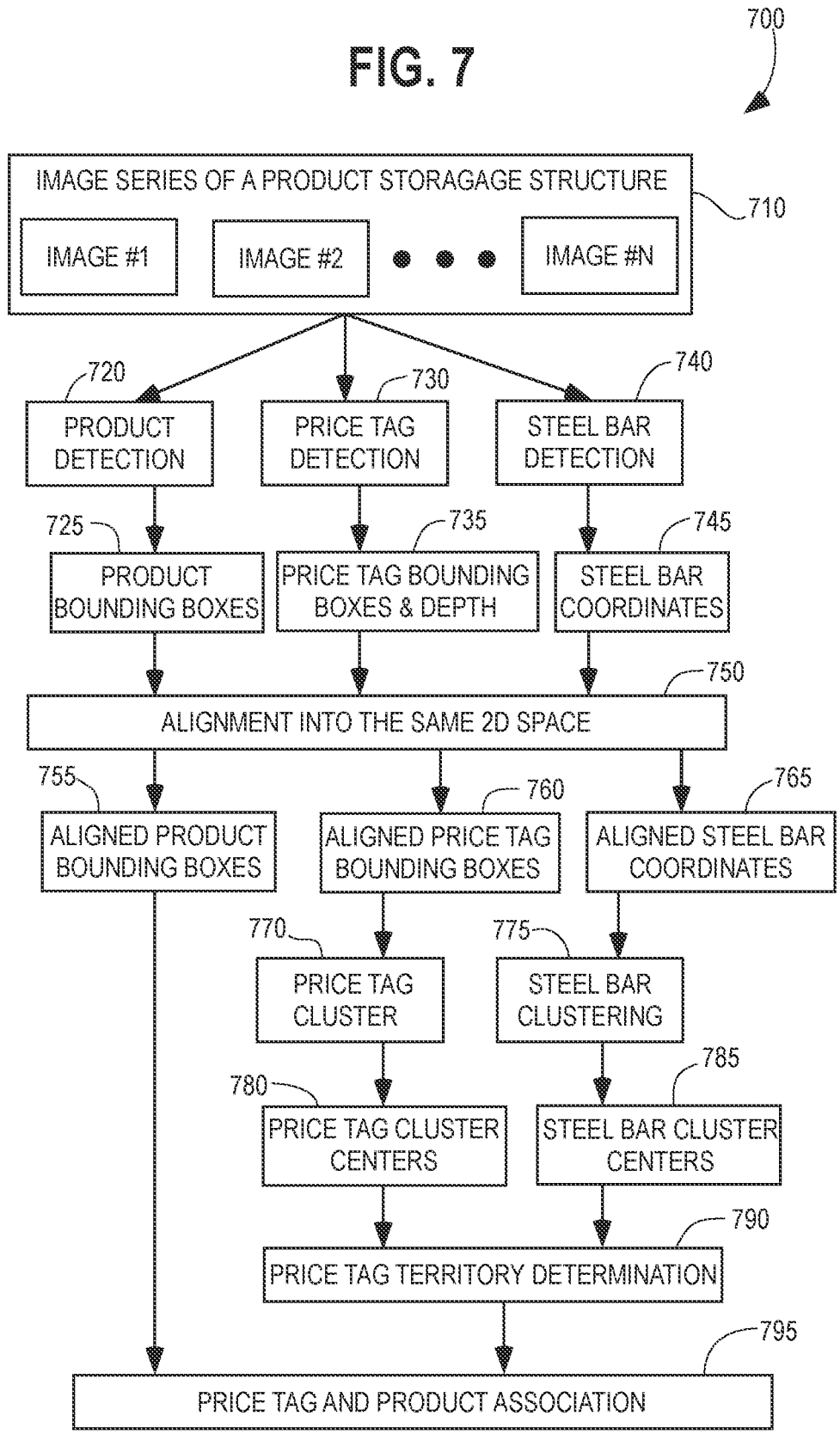
FIG. 7 is a flow diagram of an exemplary process of analyzing on-shelf price tag labels and products at a product storage facility in accordance with some embodiments.

FIG. 7 shows exemplary logic flow of an exemplary method 700 of analyzing on-shelf price tag labels 192a-192f and on-shelf products 190a-190f at a product storage facility 105 via processing digital images 180, 182, 184 of various product storage areas 110 of the product storage facility 105. The method 700 includes obtaining, by the computing device 150, a series of images (e.g., Image #1, Image #2 . . . Image #N shown in FIG. 7) that include the image 180 (see FIG. 4) of the product storage area 110 captured by the image capture device 120 during the movement of the image capture device 120 about the product storage facility 105 (step 710). As mentioned above, while this disclosure in FIG. 4 shows (for ease of illustration) only one image 180 of the product storage area 110 and the product storage structure 115 and describes the analysis of this image 180 by the control circuit 310 of the computing device 150, it will be appreciated that, in some embodiments, the control circuit 310 may process and analyze dozens or hundreds of images of the product storage area 110 that are captured (at pre-determined intervals) by the image capture device 120 while moving about the product storage facility 105, and the images 180 may be processed by the control circuit 310 as raw images 180 or as processed images 182 (e.g., pre-processed by an image-processing and/or neural network-based internet-based service 170).

In the exemplary method 700, after the computing device 150 obtains the image 180 of the product storage area 110, the control circuit 310 processes the obtained image 180 to detect the products 190a-190f (step 720), detect the price tag labels 192a-192f (step 730), and detect the vertical support members 119a-119b of the product storage structure 115 (step 740). To that end, in the embodiment illustrated in FIG. 7, the method 700 includes the control circuit 310 generating a first set of virtual boundary lines 197a-197f each surrounding a respective one of the price tag labels 192a-192f (step 735), a second set of virtual boundary lines 195a-195f each surrounding a respective one of the products 190a-190f (step 725), and a third set of virtual boundary lines 191a-191b each surrounding a respective one of the vertical support members 119a and 119b (step 745), as shown in FIG. 5. While FIG. 6 does not show a set of virtual boundary lines surrounding the horizontal support members 117a-117c of the product storage structure, it will be appreciated that, in some embodiments, the control circuit 310 processes the obtained image 180 to detect the horizontal support members 117a-117c of the product storage structure 115 and generates a fifth set of virtual boundary lines 193a-193c (shown in FIG. 5) each surrounding a respective one of the horizontal support members 117a-117c.

In some embodiments, the control circuit 310 further processes the image 180 and/or image 182 to estimate the depth from the horizontal support members 117a-117c of the product storage structure 115 to the image capture device 120 based on actual size of the price tag labels 192a-192f, which are located on respective ones of the horizontal support members 117a-117c in the image 180, as seen in FIG. 1. In some aspects, the control circuit 310 estimates this depth based on an analysis of the pixel size of the price tag labels 192a-192f in the image 180.

In one implementation, the control circuit 310 is configured to project the virtual boundary lines 195a-195f of the first set, the virtual boundary lines 197a-197f of the second set, and the virtual boundary lines 191a-191b of the third set into a 3-dimensional coordinate system based on this estimated depth. Then, according to one aspect, the control circuit 310 aligns the points of the 3-dimensional coordinate system based on location information received from the image capture device 120, and re-project the aligned points of the 3-dimensional coordinate system back to a 2-dimensional space.

For example, in the exemplary process flow 700 shown in FIG. 7, after the image 180 obtained by the computing device 150 is processed by the control circuit 310 to generate the image 182 including virtual boundary lines (also referred to as "virtual bounding boxes") 195a-195f around each of the individual products 190a-190f, virtual boundary lines 197a-197f around each of the individual price tag labels 192a-192f, and virtual boundary lines 191a-191b around each of the individual vertical support members 119a-119b, the method 700 further includes the control circuit 310 processing the image 182 to align the above-referenced first set, second set, and third set of virtual bounding boxes 195*a*-195*f,* 197*a*-197*f,* and 119*a*-119*b* into a 2-dimensional space (step 750). In one aspect, this step includes the control circuit 310 executing a light-weighted object detection model to align and aggregate the virtual bounding boxes 195*a*-195*f* of the products 190*a*-190*f* (step 755), the virtual bounding boxes 197*a*-197*f* of the price tag labels 192*a*-192*f* (step 760), and the virtual bounding boxes 191*a*-191*b* of the vertical support members 119*a*-119*b* (step 765) using the relative location information obtained from the image capture device 120.

In one aspect, the processing of the image 182 by the control circuit 310 of the computing device 150 to aggregate the virtual bounding boxes 195*a*-195*c* results in the image 184 shown in FIG. 6. After generating the image 184 depicting the aggregated virtual bounding boxes 195*a*-195*f,* 197*a*-197*f,* and 119*a*-119*b* (as shown in FIG. 6), the method 700 further includes the control circuit 310 processing the image 184 by utilizing a clustering algorithm to predict which of the virtual bounding boxes 197*a*-197*f* are representative of which price tag labels 192*a*-192*f* (step 770), and which of the virtual bounding boxes 191*a*-191*b* are representative of which vertical support members 119*a*-119*b* (step 775). In some implementations, as shown in FIG. 7, the exemplary process flow 700 may include the control circuit 310 utilizing the clustering algorithm to determine the centers of the clusters of the price tag labels 192*a*-192*f* (step 780) and to determine the centers of the clusters of the vertical support members 119*a*-119*b* (step 785).

As such, by processing the exemplary image 184 of FIG. 6, the control circuit 310 would determine in step 790 of the exemplary process flow 700 of FIG. 7 that the product storage structure 115 captured in the image 184 contains six separate product storage spaces 121*a*-121*f,* each respectively containing one or many individual units of different products 190*a*-190*f.* In some aspects, after determining the number of separate product storage spaces 121*a*-121*f* located in the image 184, the control circuit 310 of the computing device 150 generates a fourth set of virtual boundary lines 199*a*-199*f,* wherein each of the virtual boundary lines 199*a*-199*f* surrounds a respective one of the defined separate product storage spaces 121*a*-121*f* that each respectively contain the products 190*a*-190*f.* In the exemplary image 184 shown in FIG. 6, each of the separate product storage spaces 121*a*-121*f* has two or more adjacent separate product storage spaces and at least some of the virtual boundary lines 199*a*-199*f* that surround the adjacent product storage spaces 121*a*-121*f* are adjoining lines (but don't have to be adjoining and may be adjacent lines).

With reference back to FIG. 7, in the exemplary process flow 700, after the control circuit 310 detects the individual ones of the price tag labels 192*a*-192*f* located on the product storage structure 115 and defines the separate product storage spaces 121*a*-121*f* of the product storage structure 115, the control circuit 310 determines which price tag label 192*a*-192*f* is associated with/allocated to which product storage space 121*a*-121*f* of the product storage structure 115 (step 795). In one aspect, if the control circuit 310 determines in step 795 that one (or more) of the product storage spaces 121*a*-121*f* does not have a price tag label 192*a*-192*f* allocated thereto, the control circuit 310 generates a missing label alert and transmits the missing label alert over the network 130 (e.g., to the electronic database 140, to the user device 160, etc.). In one aspect, if the control circuit 310 determines in step 795 that one (or more) of the product storage spaces 121*a*-121*f* has a price tag label 192*a*-192*f* allocated thereto but no (or less than optimal amount of) products 190*a*-190*f* therein, the control circuit 310 generates an out of stock/replenishment alert and transmits the out of stock/replenishment alert over the network 130 (e.g., to the electronic database 140, to the user device 160, etc.).

In some aspects, after correlating the price tag labels 192*a*-192*f* with their respective product storage spaces 121*a*-121*f,* the control circuit 310 is programmed to cause the computing device 150 to transmit a signal including the image 184 and/or electronic data indicating the association of each of the price tag labels 192*a*-192*f* with their respective product storage spaces 121*a*-121*f* and/or their respective products 190*a*-190*f* to the electronic database 140 for storage and future retrieval. In one aspect, this image 184 may be used by the control circuit 310 of the computing device 150 in subsequent image detection operations and/or training a neural network model as a reference model of a visual representation of the product storage structure 115 and/or products 190*a*-190*f* and/or price tag labels 192*a*-192*f* and/or vertical support members 119*a*-119*b* and/or product storage areas 121*a*-121*f.*

Figure 8:
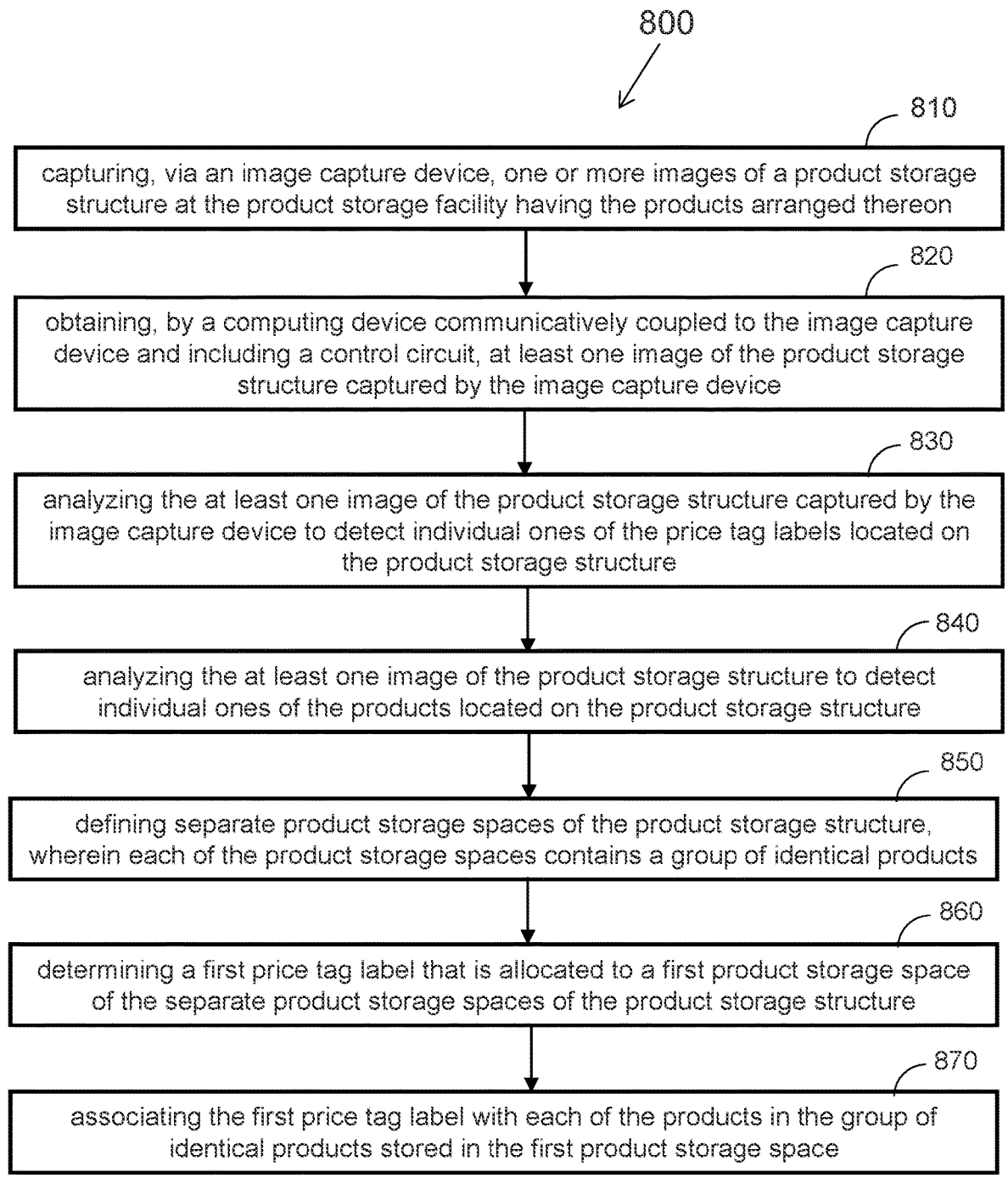
FIG. 8 is another flow diagram of an exemplary process of analyzing price tag labels and on-shelf products at a product storage facility in accordance with some embodiments.

With reference to FIG. 8, an exemplary method 800 of operation of the system 100 for analyzing on-shelf price tag labels 192*a*-192*f* and on-shelf products 190*a*-190*f* at a product storage facility 105 is described. The method 800 includes capturing, via an image capture device 120, one or more images of a product storage structure 115 at the product storage facility 105 having the products 190*a*-190*f* arranged thereon (step 810). As pointed out above, in certain implementations, step 810 may include a motorized (autonomous or human-operated) or a non-motorized human-operated image capture device 120 moving about the product storage facility 105 and about the product storage area 110 while capturing, via a camera sensor 214 of the image capture device 120, one or more images 180 of the product storage structure 115 at predetermined intervals (e.g., every second, every 2 seconds, every 3 seconds, every 5 seconds, etc.) programmed into the control circuit 206 of the image capture device 120.

The method 800 of FIG. 8 further includes several actions performed by a computing device 150 including a control circuit 310 and communicatively coupled to the image capture device 120. First, the method 800 includes obtaining at least one image 180 of the product storage structure 115 captured by the image capture device 120 (step 820). As pointed out above, the computing device 150 may obtain the image 180 directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the image 180 as described above to result in the image 182, such that, in step 820, the computing device 150 does not obtain the raw image 180, but obtains the processed image 182).

In the exemplary illustrated embodiment, after the image 180 is obtained by the computing device 150, the method 800 further includes analyzing the image 180 of the product storage structure 115 captured by the image capture device 120 to detect individual ones of the price tag labels 192*a*-192*f* located on the product storage structure 115 (step 830). As pointed out above, in some aspects, the control circuit 310 processes the data extracted from the image 180 via computer vision and/or one or more trained neural network modules/models 322 in order to detect each of the individual price tag labels 192*a*-192*f* located on the product storage structure 115 in the image 180, and to generate virtual boundary lines 197a-197f (see FIG. 5) around each one of the individual price tag labels 192a-192f detected in the image 180.

The exemplary method 800 further includes analyzing the image 180 of the product storage structure 115 captured by the image capture device 120 to detect individual ones of the products 190a-190f located on the product storage structure 115 (step 840). As pointed out above, in some aspects, the control circuit 310 processes the data extracted from the image 180 via computer vision and/or one or more trained neural network modules/models 322 in order to detect each of the individual products 190a-190f located on the product storage structure 115 in the image 180, and to generate virtual boundary lines 195a-195f (see FIG. 5) around each one of the individual products 190a-190f detected in the image 180.

After the image 180 is processed by the control circuit 310 of the computing device 150 to detect the individual products 190a-190f within the image 180 and to generate virtual boundary lines 195a-195f (also referred to herein as "virtual bounding boxes") around each of the individual products 190a-190f, the method 800 further includes defining separate product storage spaces 121a-121f of the product storage structure 115, such that each of the separate product storage spaces 121a-121f respectively contains a group of identical products 190a-190f therein (step 850).

As pointed out above, in some embodiments, the control circuit 310 processes the image 182 to aggregate the virtual bounding boxes 195a-195f, 197a-197f, 119a-119b as shown in the image 184 of FIG. 6. In one aspect, the control circuit 310 of the computing device 150 processes the image 184 by utilizing a clustering algorithm to predict which of the virtual bounding boxes 195a-195f are representative of identical individual products 190a-190f stored as a group on the product storage structure 115. As such, based on the clustering algorithm, the control circuit 310 is able to determine that a given image (e.g., image 184 in FIG. 6) shows a product storage structure 115 that contains six separate product storage spaces 121a-121f, each of which stores a respective one of six different products 190a-190f.

In the illustrated exemplary embodiment, after the control circuit 310 of the computing device 150 detects the individual ones of the price tag labels 192a-192f located on the product storage structure 115 and defines the separate product storage spaces 121a-121f of the product storage structure 115, the method 800 further includes determining a first price tag label (e.g., 192a) that is allocated to a first product storage space (e.g., 121a) of the separate product storage spaces 121a-121f of the product storage structure 115 (step 860), as well as associating (e.g., in the electronic database 140) the first price tag label (e.g., 192a) with each of the individual units of the product 190a stored in the first product storage space 121a (step 870).

As such, the exemplary method 800 of FIG. 8 results in, from a series of images 180 of the product storage structure 115 captured by the image capture device 120, a determination of which price tag label 192a-192f is associated with/allocated to which product storage space 121a-121f of the product storage structure 115. By the same token, the method 800 results in, from an image 180 of the product storage structure 115 captured by the image capture device 120, an allocation of each price tag label 192a-192f to a respective one of the products 190a-190f based on which of the product storage spaces 121a-121f each of the products 190a-190f is located in. Advantageously, the above-described processed 700 and 800 do not require multiple raw images 180 of the product storage structure 115 taken by the image capture device 120 to be pre-processed and stitched together into one image. In other words, in the above-discussed exemplary processes 700 and 800, the control circuit 210 of the computing device 150 separately processes each of the images 180 (showing various portions of the product storage structure 115) captured by the image capture device 120 and does not depend on the additional processing step of stitching the individual images 180 into one image that completely shows the entire product storage structure 115.

In some aspects, after correlating the price tag labels 192a-192f with their respective product storage spaces 121a-121f and the products 190a-190f respectively stored in the product storage spaces 121a-121f, the control circuit 310 is programmed to cause the computing device 150 to transmit a signal including the image 184 and/or electronic data indicating the association of each of the price tag labels 192a-192f with their respective product storage spaces 121a-121f (and/or the products 190a-190f respectively stored in the product storage spaces 121a-121f) to the electronic database 140 for storage and future retrieval. This advantageously enables the system 100 to use the image 184 in subsequent image detection operations and/or training a neural network model as a reference model of a visual representation of the product storage structure 115 and/or products 190a-190f and/or price tag labels 192a-192f and/or vertical support members 119a-119b and/or product storage areas 121a-121f.

The above-described exemplary embodiments advantageously provide for inventory management systems and methods, where the individual price tag labels located on the product storage structures of product storage facilities of a retailer can be efficiently allocated to appropriate product storage areas of the product storage structures (and thus to appropriate products stored in those product storage areas of the product storage structures). As such, the systems and methods described herein provide for an efficient and precise labelling of on-hand product inventory at a product storage facility and provide a significant cost savings to the product storage facility by saving the product storage facility thousands of worker hours that would be normally spent on manual on-hand product availability monitoring.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for analyzing on-shelf price tag labels and products at a product storage facility, the system comprising:
    a motorized robotic unit, wherein the motorized robotic unit includes wheels permitting the motorized robotic unit to move about the product storage facility;
    an image capture device, implemented on the motorized robotic unit, having a field of view that includes at least a portion of a product storage structure at the product storage facility having the products arranged thereon, wherein the image capture device is configured to capture one or more images from one or more angles of at least the portion of the product storage structure;
    one or more computer vision models communicatively coupled to a control circuit of a computing device, wherein the one or more computer vision models are trained using data sets including at least raw image data collected from the captured one or more images, reference image data associated with reference images of one or more product storage structures, reference images of one or more products, reference images of one or more price tag labels, and planogram data associated with the product storage facility; and the computing device including the control circuit, the computing device being communicatively coupled to the image capture device, the control circuit being configured to use the one or more computer vision models to:

analyze the at least one image of the one or more images of at least the portion of the product storage structure captured by the image capture device to detect individual ones of one or more price tag labels located on the product storage structure within the at least one image;

analyze the at least one image of at least the portion of the product storage structure to detect individual ones of the one or more products located on the product storage structure;

based on the detection of the individual ones of the one more on-shelf products located on at least the portion of the product storage structure, define one or more separate product storage spaces of the product storage structure, wherein each of the one or more separate product storage spaces contains a group of one or more identical products therein;

based on detection of the individual ones of the one or more on-shelf price tag labels located on the product storage structure and based on a definition for each of the one or more separate product storage spaces of the product storage structure, determine at least a first price tag label that is allocated to at least a first product storage space of the separate product storage spaces of the product storage structure; and based on a determination of at least the first price tag label that is allocated to at least the first product storage space, associate at least the first price tag label with each of the one or more products in the group of the one or more identical products stored in the first product storage space.

2. The system of claim 1, wherein the control circuit is programmed to generate a first set of virtual boundary lines and a second set of virtual boundary lines, wherein each of the virtual boundary lines of the first set surrounds an individual one of the price tag labels detected in the at least one image, and wherein each of the virtual boundary lines of the second set surrounds an individual one of the products detected in the at least one image.

3. The system of claim 2, wherein the product storage structure comprises a plurality of horizontal support members interconnected by vertical support members; and wherein the control circuit is further programmed to:

analyze the at least one image of the product storage structure to detect individual ones of the vertical support members of the product storage structure; and based on detection of the individual ones of the vertical support members of the product storage structure, generate a third set of virtual boundary lines, wherein each one of the virtual boundary lines of the third set surrounds an individual one of the vertical support members detected in the at least one image.

4. The system of claim 3, wherein the virtual boundary lines of the first set, the second set, and the third set are 2-dimensional, and wherein the control circuit is further programmed to:

estimate depth from the horizontal support members of the product storage structure to the image capture device based on actual size of the price tag labels in the at least one image and based on a pixel size of the price tag labels in the at least one image;

project the virtual boundary lines of the first set, the second set, and the third set into a 3-dimensional coordinate system based on the estimated depth;

align points of the 3-dimensional coordinate system based on location information received from the at least one image capture device; and re-project the aligned points of the 3-dimensional coordinate system back to a 2-dimensional space.

5. The system of claim 4, wherein the control circuit is further programmed to cluster the virtual boundary lines of at least one of the first, second, and third sets to define each of the separate product storage spaces containing the group of the identical products therein.

6. The system of claim 5, wherein the control circuit is programmed to generate a fourth set of virtual boundary lines, wherein each of the virtual boundary lines of the fourth set surrounds one of the defined separate product storage spaces containing the group of the identical products therein; and wherein the first product storage space has two or more adjacent separate product storage spaces that are each surrounded by virtual boundary lines of the fourth set that adjoin the virtual boundary lines of the fourth set that surround the first product storage space.

7. The system of claim 5, wherein the control circuit is programmed to define each of the separate product storage spaces containing the group of the identical products therein based at least on one or both of center cluster coordinates of the price tag labels and center cluster coordinates of the vertical support members.

8. The system of claim 1, wherein, based on a determination by the control circuit that at least one of the separate product storage spaces does not have a price tag label allocated thereto, the control circuit is programmed to generate a missing label alert and to transmit the missing label alert.

9. The system of claim 1, further comprising an electronic database configured to store the images captured by the image capture device, and wherein the control circuit is programmed to transmit, to the electronic database for storage, a signal including electronic data associating the first price tag label with each of the products in the group of identical products stored in the first product storage space.

10. A method of analyzing on-shelf price tag labels and products at a product storage facility, the method comprising:

capturing, via an image capture device having a field of view that includes at least a portion of a product storage structure implemented on a motorized robotic unit, one or more images of a product storage structure at the product storage facility having the products arranged thereon, wherein the motorized robotic unit includes wheels permitting the motorized robotic unit to move about the product storage facility;

obtaining, by a computing device communicatively coupled to the image capture device and including a control circuit, at least one image of the product storage structure captured by the image capture device;

by the control circuit of the computing device:
analyzing, using one or more computer vision models communicatively coupled to a control circuit of a computing device, wherein the one or more computer vision models are trained using data sets including at least raw image data collected from the captured one or more images, reference image data associated with reference images of one or more product storage structures, reference images of one or more products, reference images of one or more price tag labels, and planogram data associated with the product storage facility, the at least one image of the product storage structure captured by the image capture device to detect individual ones of the price tag labels located on the product storage structure;
analyzing the at least one image of the product storage structure to detect individual ones of the products located on the product storage structure;
based on detection of the individual ones of the products located on the product storage structure, defining separate product storage spaces of the product storage structure, wherein each of the separate product storage spaces contains a group of identical products therein;
based on detection of the individual ones of the price tag labels located on the product storage structure and based on a definition of the separate product storage spaces of the product storage structure, determining a first price tag label that is allocated to a first product storage space of the separate product storage spaces of the product storage structure; and
based on a determination of the first price tag label that is allocated to the first product storage space, associating the first price tag label with each of the products in the group of identical products stored in the first product storage space.

11. The method of claim 10, further comprising, generating, by the control circuit, a first set of virtual boundary lines and a second set of virtual boundary lines, wherein each of the virtual boundary lines of the first set surrounds an individual one of the price tag labels detected in the at least one image, and wherein each of the virtual boundary lines of the second set surrounds an individual one of the products detected in the at least one image.

12. The method of claim 11,
Wherein the product storage structure comprises a plurality of horizontal support members interconnected by vertical support members; and
further comprising, by the control circuit:
analyzing the at least one image of the product storage structure to detect individual ones of the vertical support members of the product storage structure; and
based on detection of the individual ones of the vertical support members of the product storage structure, generating a third set of virtual boundary lines, wherein each one of the virtual boundary lines of the third set surrounds an individual one of the vertical support members detected in the at least one image.

13. The method of claim 12, wherein the virtual boundary lines of the first set, the second set, and the third set are 2-dimensional, and further comprising, by the control circuit:
estimating depth from the horizontal support members of the product storage structure to the image capture device based on actual size of the price tag labels in the at least one image and based on pixel size of the price tag labels in the at least one image;
projecting the virtual boundary lines of the first set, the second set, and the third set into a 3-dimensional coordinate system based on the estimated depth;
aligning points of the 3-dimensional coordinate system based on location information received from the at least one image capture device; and
re-projecting the aligned points of the 3-dimensional coordinate system back to a 2-dimensional space.

14. The method of claim 13, further comprising, by the control circuit, clustering the virtual boundary lines of at least one of the first, second, and third sets to define each of the separate product storage spaces containing the group of the identical products therein.

15. The method of claim 14,
further comprising, by the control circuit, generating a fourth set of virtual boundary lines, wherein each of the virtual boundary lines of the fourth set surrounds one of the defined separate product storage spaces containing the group of the identical products therein; and
wherein the first product storage space has two or more adjacent separate product storage spaces that are each surrounded by virtual boundary lines of the fourth set that adjoin the virtual boundary lines of the fourth set that surround the first product storage space.

16. The method of claim 14, further comprising, by the control circuit, defining each of the separate product storage spaces containing the group of the identical products therein based at least on center cluster coordinates of the price tag labels and center cluster coordinates of the vertical support members.

17. The method of claim 10, further comprising, by the control circuit:
based on a determination by the control circuit that at least one of the separate product storage spaces does not have a price tag label allocated thereto, generating a missing label alert; and
transmitting the missing label alert to a user device of a worker of the retail store to cause the user device of the worker to display a notification including the missing label alert to the worker.

18. The method of claim 10, further comprising:
storing the images captured by the image capture device in an electronic database, and
transmitting, via the control circuit, a signal to the electronic database for storage, the signal including electronic data associating the first price tag label with each of the products in the group of identical products stored in the first product storage space.

* * * * *